(12) United States Patent
Garvey et al.

(10) Patent No.: US 10,920,668 B2
(45) Date of Patent: Feb. 16, 2021

(54) ENERGY STORAGE SYSTEM (71) Applicant: Cheesecake Energy Ltd., Nottingham (GB)

(72) Inventors: Seamus Garvey, West Bridgford (GB); Bruno Cárdenas, Nottingham (GB); Bharath Kantharaj, Bromley (GB); Michael Simpson, London (GB); Andrew Pimm, Horsforth (GB); James Garvey, West Bridgford (GB); Paul Codd, Iquique (CL)

(73) Assignee: Cheesecake Energy LTD., Nottingham (GB)

( * ) Notice: Subject to any disclaimer, the term of this patent is extended or adjusted under 35 U.S.C. 154(b) by 0 days.

(21) Appl. No.: 15/781,040

(22) PCT Filed: Dec. 5, 2016

(86) PCT No.: PCT/GB2016/053831
§ 371 (c)(1),
(2) Date: Jun. 1, 2018

(87) PCT Pub. No.: WO2017/093768
PCT Pub. Date: Jun. 8, 2017

(65) Prior Publication Data
US 2019/0003383 A1 Jan. 3, 2019

(30) Foreign Application Priority Data

Dec. 3, 2015 (GB) .................................. 1521372.1
Jul. 25, 2016 (GB) .................................. 1612878.7

(51) Int. Cl.
*F02C 6/16* (2006.01)
*F02C 3/04* (2006.01)
*F03G 6/00* (2006.01)

(52) U.S. Cl.
CPC ................ *F02C 6/16* (2013.01); *F02C 3/04* (2013.01); *F03G 6/00* (2013.01); *Y02E 60/16* (2013.01)

(58) Field of Classification Search
CPC .... Y02E 60/15; F02C 6/16; F02C 1/04; F02C 1/05; F02C 1/06; F02C 1/08; F02C 1/10;
(Continued)

(56) References Cited

U.S. PATENT DOCUMENTS 3,677,008 A * 7/1972 Koutz ...................... F02C 6/16
60/650
8,863,519 B2 10/2014 Kraft
(Continued)

FOREIGN PATENT DOCUMENTS

EP 2687702 1/2014
GB 2519626 4/2015
(Continued)

OTHER PUBLICATIONS

International Searching Authority, "International Search Report and Written Opinion of the International Searching Authority," issued in connection with International Patent Application No. PCT/GB2016/053831, dated Mar. 22, 2017, 10 pages.

*Primary Examiner* — Mark A Laurenzi
*Assistant Examiner* — Xiaoting Hu
(74) *Attorney, Agent, or Firm* — Reinhart Boerner Van Deuren s.c.

(57) ABSTRACT

A system comprising two or more thermal stores, a single store for pressurised air and a means of collecting relatively low-grade heat offers the potential for an energy storage system that achieves two desirable aims at the same time: (i) the total exergy that may be released when a given pressurised air store is discharged is maximised and (ii) the ratio between the exergy extracted and the work invested in
(Continued)

compressing the air via a multi-stage compressor is also increased by exploiting some source of low-grade heat to augment the thermal content of several thermal stores. The system comprises a compressed air energy storage system which tends, in any one fill-empty cycle of the pressurised air store, to pump heat upwards in temperature from lower-grade stores to the highest-grade thermal store as well as a thermal capture subsystem that can augment the heat content of the lower-grade thermal stores. Some provision is also present whereby other fluid can be introduced into the expansion process in addition to the air that was compressed via the multi-stage compressor facility.

13 Claims, 7 Drawing Sheets

(58) Field of Classification Search
CPC ... F02C 1/105; F03G 6/00; F03G 6/02; F03G 6/04; F28D 20/0034; F28D 2020/0078
See application file for complete search history.

(56) References Cited

U.S. PATENT DOCUMENTS

| | | | |
|---|---|---|---|
| 2003/0033810 A1* | 2/2003 | Kreitmeier | F02C 6/14 60/772 |
| 2010/0251711 A1 | 10/2010 | Howes et al. | |
| 2012/0038170 A1* | 2/2012 | Stuart | F03D 3/005 290/55 |
| 2014/0020369 A1* | 1/2014 | Guidati | F02C 6/16 60/327 |
| 2015/0267612 A1 | 9/2015 | Bannari | |
| 2018/0258849 A1* | 9/2018 | Geisler | F02C 6/16 |

FOREIGN PATENT DOCUMENTS

| | | | |
|---|---|---|---|
| WO | WO-2010125568 A2 * | 11/2010 | F03D 9/17 |
| WO | WO2013164562 | 11/2013 | |
| WO | WO2013164563 | 11/2013 | |
| WO | WO-2016091475 A1 * | 6/2016 | F02C 6/16 |

* cited by examiner

ENERGY STORAGE SYSTEM

CROSS-REFERENCE TO RELATED PATENT APPLICATIONS

This application is a National Stage entry of International Application No. PCT/GB2016/053831, filed on Dec. 5, 2016, which claims priority to United Kingdom Application No. 1612878.7, filed on Jul. 25, 2016, and to United Kingdom Application No. 1521372.1, filed on Dec. 3, 2015, which are incorporated herein by reference in their entireties.

FIELD OF THE INVENTION

The invention relates to compressed air energy storage and renewable generation

BACKGROUND

The increasing amount of inflexible power generation in the world drives a similarly increasing need for cost-effective energy storage methods. Various approaches for the storage of energy in different forms are being considered and compressed air energy storage (CAES) is one of the most promising candidates, especially in places geographically suited to the creation of large underground air stores.

CAES systems compress air (normally during periods when electrical power is at low value) and this pressurised air is stored at ambient temperature or a temperature close to that. Energy is recovered (normally at periods when electrical power has high value) by expanding the pressurised air. The containment used to store the high pressure air constitutes a major expense and a substantial fraction of the total cost of any CAES system lies in the cost of the containment. The value of any energy storage system depends in large part on the quantity of energy stored. Systems that can store more energy tend to be more valuable than those that store less. Thus a system design that enables more energy to be stored at a relatively low marginal cost is attractive.

The high pressure stores for CAES systems invariably store the air at temperatures close to ambient temperature. However, the temperature of air tends to rise during compression unless heat is removed. The system designer has to decide whether to remove the heat steadily at near-ambient temperatures or whether to allow that heat to be removed at substantially higher temperatures. Basic thermodynamics reasoning confirms that if air enters the compression process for any CAES plant at ambient temperature and if that air will also be stored at or near to ambient temperature, the total heat energy that is removed from air is identical to the work that has been put into compressing it. If the average temperature of air during compression is well above ambient temperature, an increased amount of work will be required to perform the compression and an increased amount of heat will be removed from the air prior to its storage in the high pressure store.

There are some strong arguments for extracting heat from air compression at higher temperatures in terms of increasing the exergy storage capacity associated with any given store for high-pressure air. Previous patent applications such as EP2687702A1 (filed on Jul. 20, 2012) and GB1516599.1 (filed on Sep. 18, 2015). The present invention extends the same basic reasoning to allow the exploitation of low-grade heat from any source that may be available locally at near zero cost. The most common potential source of such low-grade heat is connected with solar thermal energy capture.

Thus, this invention achieves a double objective. Firstly it increases the amount of exergy that can be stored in conjunction with a given high pressure air store compared with an arrangement in which air enters the compression process at ambient temperature. Secondly, it increases the ratio between work (or electrical energy) emerging from the energy store and the work (or electrical energy) being supplied to that store by allowing the system to exploit the potential capture of low-grade heat.

A feature that is common to GB1516599.1, and to this present patent application is that the pressurised air is exploited as a resource by which thermal energy can be re-converted very efficiently into work rather than as the primary energy store itself.

SUMMARY OF THE INVENTION

The key distinguishing feature of this present invention over EP2687702A1 and GB1516599.1 is that the systems described in both of those cases had zero net heat energy input. Heat of compression stored during the charging phase of any cycle would be withdrawn again (at temperatures only slightly lower than those at which that heat was gathered). The same gas passed through the expansion that had been previously been compressed. By contrast, the present invention proposes that the heat of compression should indeed be stored but that other heat should also be captured and put into store. That additional heat might be derived as waste heat from some industrial process or it might be collected directly from solar thermal collectors. In order to exploit that additional heat in the most effective way, additional gaseous fluid is required in the expansion process. The additional heat is collected at temperatures in a range lower than the range of temperatures over which the heat of compression is stored.

This invention is a system for storing exergy (i.e. energy available to be used) at relatively low cost that simultaneously allows some relatively low-grade heat captured locally to be converted into additional output exergy. The ability of this system to exploit some relatively low-grade heat means that a high ratio between input work and output work can be achieved possibly exceeding unity in some circumstances.

Exergy is stored within the system in two distinct ways (a) in a high-pressure air store and (b) in thermal form within two or more thermal stores. At least one thermal store is a store for high-grade heat and at least one distinct thermal store retains lower-grade heat. A typical range of temperatures for the high-grade heat would be between 300° C. and 600° C. whilst a typical range of temperatures for the low-grade heat would be between 20° C. and 300° C. A typical storage pressure for the compressed air would be 200 bar.

According to a first aspect of the invention there is provided an energy storage system comprising: a storage volume for storing compressed gas; a multi-stage gas compressor configured to compress air that has been heated to a first temperature, the compression being such that the air leaving each compression stage reaches a second temperature; an expander operable to extract work from the gas entering the expander at the second temperature and from which expander the exhaust gas emerges at a temperature significantly lower than the first temperature; one or more first thermal stores configured to retain heat at temperatures in a range up to the first temperature and; second thermal store configured to retain heat at temperatures in a range between the first temperature and second temperature; and a means of capturing heat from an external source for storing in the one or more first thermal stores at temperatures in a range up to the first temperature.

The gas may comprise air. The temperature of the exhaust gas may be at least 20K or at least 50K or at least 100K below the first temperature.

Compared with other system designs, this design offers increased exergy storage capacity associated with a given store of pressurised air and it further offers the capability to exploit any local source of low-grade heat so that additional exergy may be extracted from that additional low-grade heat source at relatively low additional capital cost.

The combination of the features of the first aspect may be operable such that there is a high ratio between total output work and total input work and such that there is also a high ratio between the total work that can be output from the system and the work that could be extracted from the stored gas alone without use of the thermal stores.

In some embodiments the system may be operable to store energy in a charging mode, the charging mode comprising two or more different charging processes that are independently operable; and wherein the two or more charging processes comprise: a first charging process in which gas is compressed in the multi-stage compressor to fill the storage volume with pressurised gas and the second thermal store is simultaneously filled with heat; and a second charging process in which the first thermal store is filled with heat.

In some embodiments the total mass of gas expanded in the expander in a discharging mode is greater than the total mass of gas compressed in the multi-stage compressor in the first charging mode, in order that the additional heat collected into the system can be consumed productively to increase the work output by the system. An additional gaseous fluid may be introduced into the expander to increase the total mass of gaseous fluid. The additional gaseous fluid introduced into the expander may be compressed gas; or steam obtained by evaporating water, and optionally having been compressed without electrically powered compression.

In some embodiments the storage volume may be approximately isobaric in nature (i.e. the gas may be stored in the volume under constant pressure).

In some embodiments the means of capturing heat may comprise a means for capturing concentrated solar thermal power.

Charging of the energy storage plant may take place by two distinct mechanisms: a first charging process comprising air compression using work obtained from some external source (usually an electrically-driven motor) and a second charging process comprising collection of low-grade heat from some source that may comprise solar thermal collection. These two charging processes need not be synchronous or even proportional. Either one of these charging processes might be occurring at any one time whether or not the other charging process is taking place. Discharging of the energy storage plant involves a single process only: expansion of gaseous fluid with concomitant fall in temperature of that fluid. Discharging could occur simultaneously with either one or both of the charging processes.

While air is being compressed via the multi-stage compressor and put into the high-pressure air store, the air is heated prior to compression so that the heat released by that compression is taken out in the high temperature range, between the first and second temperatures, and this heat is retained in the highest grade thermal store. The lower-grade heat supplied to the air prior to compression is returned from the pressurised air emerging from the multi-stage compressor. Thus, apart from some initial transient behaviour following a change of operation mode to begin compression, the net heat flow between the combined low-pressure and high-pressure air streams and the lower-grade thermal stores is approximately zero.

During the discharging process, high pressure air emerges from the pressurised air store and collects heat each of the thermal stores prior to expansion such that it enters the expansion provision at a temperature close to the second temperature. To exploit all of the heat that has been captured by the system during the charging processes, more gaseous fluid must enter the expansion provision than was compressed in the multi-stage compressor facility. In at least some cases, that additional gaseous fluid entering the expander is steam raised by evaporating water that has been pumped up to the same pressure as the high pressure air before receiving heat from the thermal stores.

A feature of this invention is that the number of stages of compression may be greater than the number of stages of expansion. This is because all of the heat deposited into storage in the highest-grade thermal store derives from air having been compressed in two or more stages and this heat will be used in part to reheat air returning from the high-pressure store that had been compressed by the multi-stage compressor in addition to some other gaseous fluid. The effect of this is that in any one full cycle of the high-pressure air store the air that has passed through the multi-stage compression facility effectively pumps some heat up from lower temperature ranges to the high temperature range. The additional fluid draws net heat from all temperature ranges and the external supply of heat provides net heat into the system only in the lower ranges of temperature.

According to a second aspect of the invention there is provided an energy storage system for storing exergy, the system comprising: a first thermal store for heating and cooling a gas between a third temperature and a first temperature; a second thermal store for heating and cooling the gas between a second temperature and the first temperature; a multi-stage compressor coupled to the first thermal store for receiving the gas at the first temperature and for pressurising the gas, such that the gas is heated to the second temperature; a storage volume configured to store the pressurised gas at the third temperature; an expander for depressurising the pressurised gas to extract work from the pressurised gas such that the gas is cooled from the second temperature to a lower temperature; and wherein the pressurised gas is cooled to the first temperature by the second thermal store and further cooled to the third temperature by the first thermal store before being stored in the storage volume; wherein the pressurised gas is heated to the first temperature by the first thermal store and further heated to the second temperature by the second thermal store before being depressurised.

Some embodiments may further comprise an external heat source for providing heat to the first thermal store. The external heat source may comprise a solar energy collector.

In some embodiments, each compression stage of the multi-stage compressor may be configured to compress the gas such that the gas is heated to the second temperature. The gas may be cooled from the second temperature to the first temperature by the second thermal store after each compression stage of the multi-stage compressor.

In some embodiments the expander may be a multi-stage expander. The gas may be heated to the second temperature by the second thermal store before each expansion stage of the multi-stage expander. The number of compression stages of the multi-stage compressor may be greater than the number of expansion stages of the multi-stage expander.

In some embodiments, the first thermal store may comprise a plurality of first thermal stores arranged in series such that the gas is incrementally heated or cooled between a or the third temperature and the second temperature by the series of first thermal stores.

In some embodiments, the gas may be cooled to the third temperature by the first thermal store after being depressurised and before being ejected from the system.

Some embodiments may further comprise an additional fluid inlet for injecting an additional fluid into the pressurised gas before the expander. The additional fluid is heated by the first and/or second thermal store. The additional fluid may comprises air or steam.

Some embodiments may further comprise an additional compressor for compressing an additional gas.

According to a third aspect of the invention there is provided a method of storing and releasing energy, the method comprising: heating a gas to a first temperature using heat stored in a first heat store; pressurising the heated gas such that its temperature rises from the first temperature to a second temperature; extracting heat from the pressurised gas to cool the pressurised gas from the second temperature to the first temperature and storing the extracted heat in a second heat store; extracting heat from the pressurised gas to cool the pressurised gas from the first temperature to a third temperature and storing the extracted heat in the first thermal store; storing the pressurised gas in a storage volume; heating the pressurised gas from the storage volume to the first temperature using heat from the first thermal store; heating the pressurised gas to the second temperature using heat from the second thermal store; and expanding the pressurised gas to extract work from the pressurised gas such that the gas is cooled from the second temperature to a lower temperature.

In some embodiments the method may further comprise extracting heat from the gas to cool the gas from the lower temperature to the third temperature and storing the extracted heat in the first thermal store.

In some embodiments the first thermal store may comprise a plurality of first thermal stores. Heating the gas to the first temperature may comprise heating the gas in each of the plurality of first thermal stores. Extracting heat from the pressurised gas to cool the pressurised gas from the first temperature to a third temperature and storing the extracted heat in the first thermal store may comprise storing a portion of the extracted heat in each of the plurality of first thermal stores.

In some embodiments, pressurising the heated gas may comprise pressurising the gas in a plurality of compression stages. Heat may be extracted from the pressurised gas after each of the plurality of stages and stored in the second heat store.

Some embodiments may further comprise storing heat from an external heat source in the first thermal store or plurality of first thermal stores. The external heat source comprises a solar energy collector.

Some embodiments may further comprise adding an additional fluid to the pressurised gas before expanding the pressurised gas. Expanding the pressurised gas may comprise expanding the pressurised gas and the additional fluid. Adding the additional fluid to the pressurised gas may comprise heating the additional fluid using heat stored in the first and/or second thermal store. The additional fluid may comprise air or steam.

It is obvious that some exergy can be withdrawn from a local source of low-grade heat using standalone provisions such as those based on organic Rankine-cycles or Stirling engines but these will normally have much higher marginal costs for comparable marginal efficiencies (additional exergy recovered divided by the amount of heat collected) relative to the system proposed here.

It is to be understood that the terms first temperature, second temperature, and third temperature need not be exact temperatures, but may instead comprise a range of temperatures around an intended temperature, for example a range of 10° C. above and/or below an intended first, second, or third temperature respectively, or a range of 20° C., 30° C., or 50° C. above and/or below an intended first, second, or third temperature respectively.

DETAILED DESCRIPTION

The invention is described in further detail below by way of examples and with reference to the accompanying drawings, in which.

Two broad classes of embodiment are described here. Separate figures are used in each case.

A First Embodiment of the Invention

Figure 1:
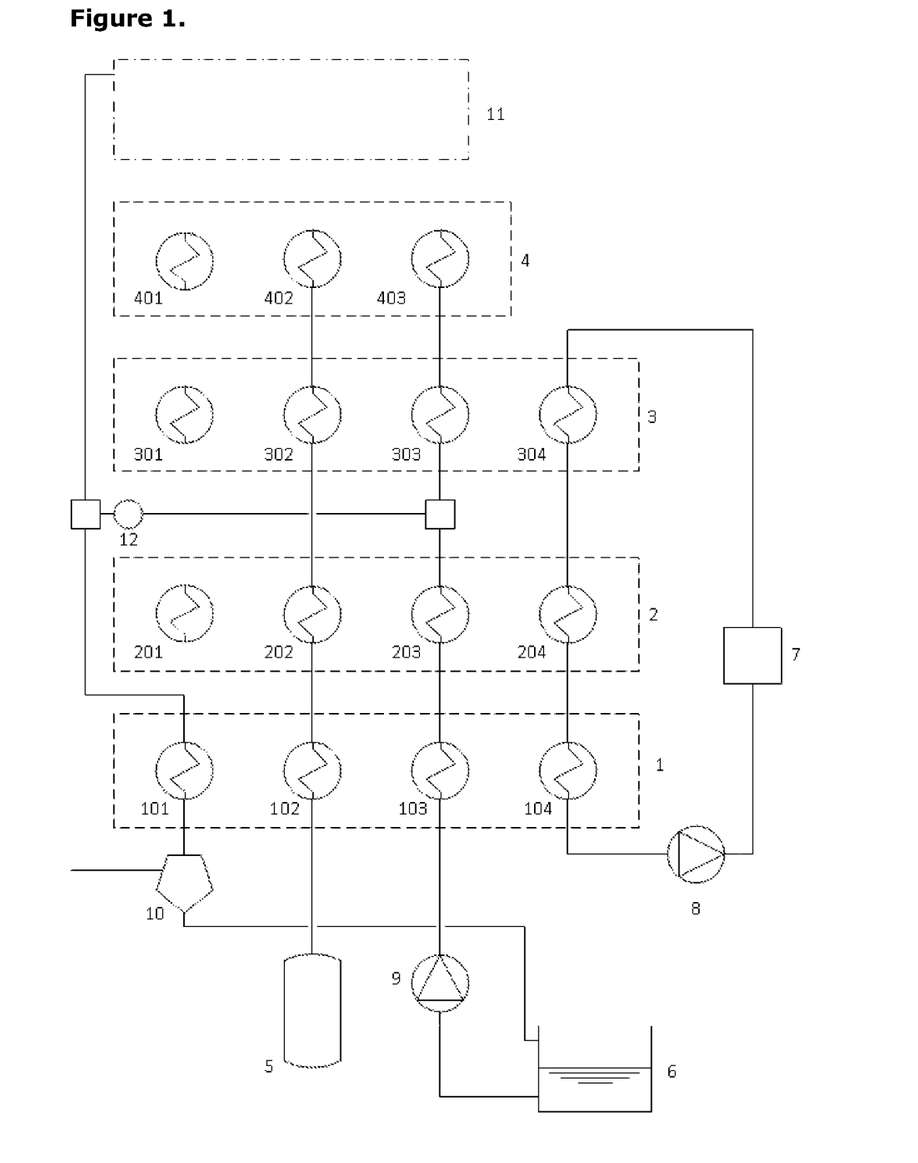
FIG. 1 presents a schematic diagram of a first embodiment of the invention.

FIG. 1 presents a schematic diagram of a first embodiment of the invention in which the additional fluid used in the expansion process is steam raised by evaporating water held in a tank. This figure omits any details of the multi-stage compression and expansion processes.

Figure 2:
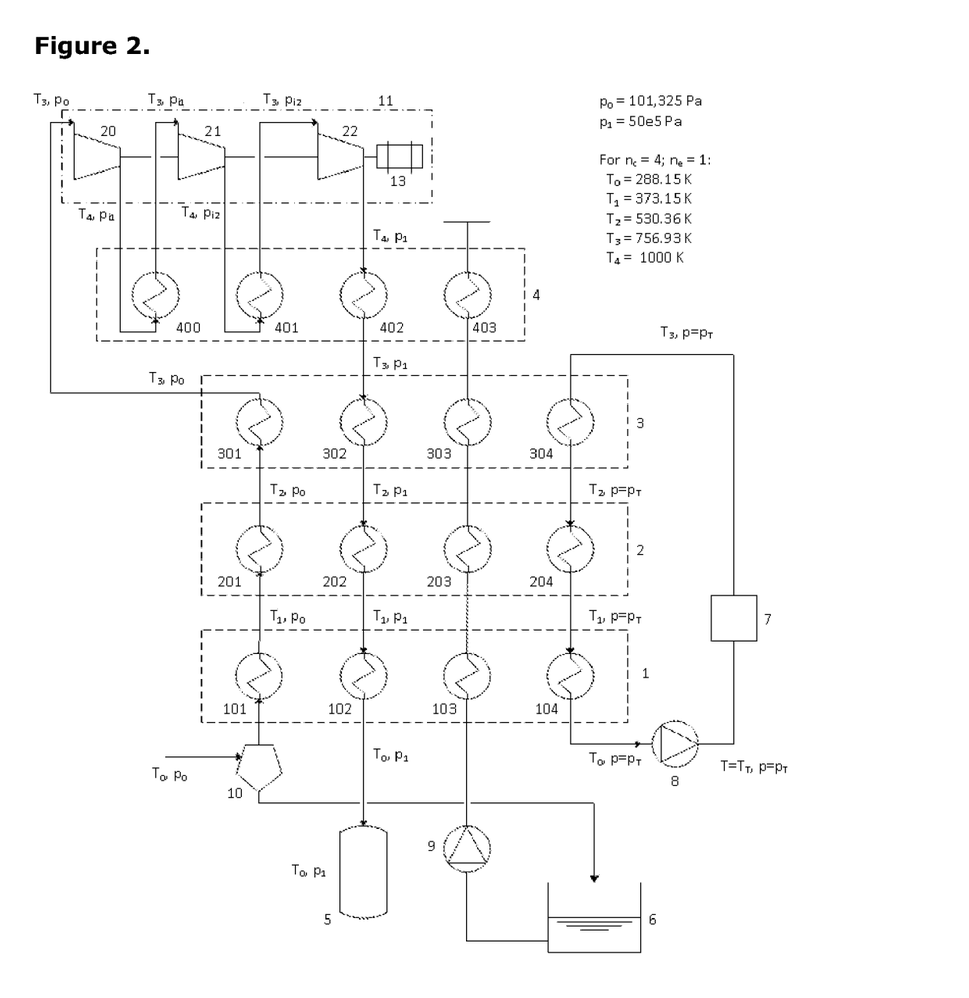
FIG. 2 presents a schematic diagram of the same first embodiment of the invention as FIG. 1 in which a multi-stage compression provision active in the first charging process comprises three distinct stages of compression.

FIG. 2 presents a schematic diagram of the same first embodiment of the invention as FIG. 1 in which the multi-stage compression provision active in the first charging process comprises three distinct stages of compression.

Figure 3:
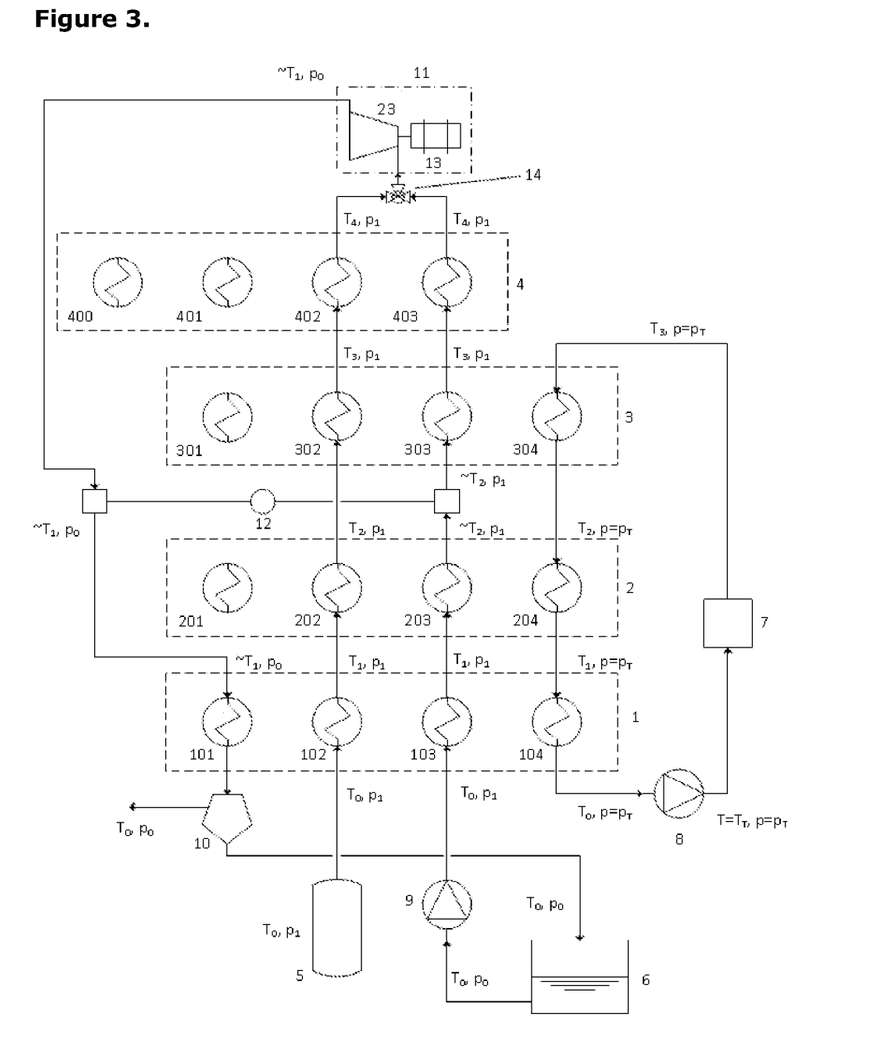
FIG. 3 presents a schematic diagram of the same first embodiment of the invention as FIG. 1 in which the expansion process comprises a single stage of expansion.

FIG. 3 presents a schematic diagram of the same first embodiment of the invention as FIG. 1 in which the expansion process comprises a single stage of expansion.

FIGS. 1, 2 and 3 together support a description of one specific embodiment of the invention. The system comprises energy storage elements, power-conversion or power-transfer elements and other elements. In the following text relating to the first embodiment, "water" is used to represent the additional fluid that will be injected into the system during the discharging process and "100° C." is used to represent the boiling point of that additional fluid at ambient pressure. The "first temperature" referred to in the summary of the invention is the temperature $T_3$ which is the lowest temperature in the uppermost thermal store and the "second temperature" is the temperature $T_4$ which is the highest temperature in the entire system.

FIG. 1 shows the arrangement of thermal storage together with some other components. Four different thermal stores are identified in this FIG. 1,2,3,4 in order of increasing thermal grade (temperature range). A high pressure air store, 5, is necessarily present. Also a water tank, 6, must be present and some means of collecting low grade heat, 7, must also be in place. One pump, 8, is dedicated to the circulation of a heat transfer fluid to carry heat from 7 into the thermal stores. Another pump, 9, is present to pressurise water drawn from the tank, 6, and to drive this through the system. A separator, 10, is present to remove water from the air-water mix emerging after the expansion process and to return that water to the tank. At the top of FIG. 1, a region labelled 11 represents the compression and expansion machinery set of which further details are presented in subsequent figures. One other important element in FIG. 1 is a heat-pump 12 that would be present in most instantiations of this invention. Its function is explained later.

Each thermal store has, or may have, several different heat exchange provisions. Thermal store 1, for example, has heat exchange provisions 101, 102, 103 and 104 with different intended fluids and operating pressures. Thermal store 2 has heat exchange provisions 201, 202, 203 and 204 with different intended fluids and operating pressures.

Some of the lines conveying air and water between different parts of the system are not completed in FIG. 1 because their configuration may change between operating modes. None of these lines are labelled since their functions are obvious from the explanation of other components.

FIG. 2 shows one possible instance of the system configured for operation in the charging mode. The compression and expansion machinery set, 11, is seen to comprise a three-stage compression process in this instance. A motor-generator unit, 13, drives the three compressor stages, 20, 21 and 22, and the pressurised air delivers heat into the hottest thermal store, 4, in three separate heat exchanger provisions, 400, 401 and 402.

FIG. 3 shows one possible instance of the system configured for operation in the discharging mode. The compression and expansion machinery set, 11, is seen to comprise a single-stage expansion process in this instance. The fluid entering the expander is a mixture of air and steam through the mixing junction, 14. The high pressure air picks up heat of increasing grade through heat exchange units 102, 202, 302 and 402 in turn whilst the water/steam picks up heat from heat exchange units 103, 203, 303 and 403 in turn as well as from the hot end of a heat pump, 12. The motor-generator unit, 13, is driven by the expander, 23. The exhaust stream from this expander surrenders the latent heat of condensation into the low-temperature side of heat-pump, 12, and then surrenders the remaining heat into the lowest grade thermal store, 1, via heat exchange provision, 101.

The energy storage elements comprise four thermal stores, 1, 2, 3 and 4 of increasing temperature ranges and one store for high pressure air, 5. The thermal stores may comprise sensible thermal storage or they may alternatively use other mechanisms. The lowest grade thermal store, 1, would normally comprise a simple unpressurised tank of water. The high pressure air store would ideally be an isobaric (constant pressure) store and this could be realised by any one of several means. The use of natural hydrostatic head in conjunction with deep underwater storage of air or deep underground storage with an available shuttle-pond provide obvious possible solutions but any fixed-volume containment could be transformed into an isobaric containment by providing the capability to pump in a liquid (normally water) to displace air that is being removed from the tank.

For the sake of brevity and clarity, this explanation assumes that all components of the system behave in an ideal way all heat transfer has zero temperature difference, all fluid flows experience negligible flow resistance and all compression/expansion processes are perfectly isentropic. The adjustments that would be made to accommodate non-ideal behaviour of components will be obvious to any person skilled in the art of thermo-mechanical energy storage.

An understanding of the system design depends on an appreciation of the temperatures and pressures within the system. Two pressures are given specific labels: $p_0$ represents ambient pressure (around 101,325 Pa) and $p_1$ represents the pressure of the high pressure store (which might typically be anything between 80 bar and 500 bar). Other intermediate pressures will certainly occur in the system. For example, if there were three stages of compression, there would be intermediate pressures at $(r \times p_0)$ and at $(r^2 \times p_0)$ where $r^3 := (p_1/p_0)$. For the purposes of this description, we do not require to attach specific notations to these intermediate pressures.

We denote the lower temperatures of each of the thermal stores (1,2,3,4) as $T_0$, $T_1$, $T_2$ and $T_3$ respectively. The upper temperatures of each of these thermal stores are denoted $T_1$, $T_2$, $T_3$ and $T_4$ respectively. Note that the "first temperature" of the summary of the invention is $T_3$ and the "second temperature" of the summary of the invention is $T_4$—the highest temperature in the system.

Temperature $T_4$ is determined mainly from an assessment of what materials are available for the highly-stressed components of the compressor and expander machinery and for the high-pressure heat exchanger elements. Typically $T_4$ will be around 1000K. $T_0$ is ambient temperature—typically 280K. $T_1$ is slightly below the boiling point of water at ambient pressure—around 370K (97° C.). $T_2$ is exactly the boiling point of water at pressure $p_1$. In a real system design process, we would distinguish between a temperature $T_{2a}$ marginally below $T_2$ and another temperature $T_{2b}$ that was fractionally above $T_2$ but since we are considering ideal behaviour here, there is only one temperature $T_2$. Finally, temperature $T_3$ is determined by working downwards from $T_4$ recognising that if each compression stage achieves a pressure ratio of r we must have $(T_4/T_3) = r^{0.2857}$. As an example, if $(p_1/p_0) = 64$ and there are three stages of compression, then $r=4$ and $T_3 = (T_4/4^{0.2857}) = 673K$ if $T_4 = 1000K$. Any of the temperatures may comprise a range of 50K, 20K, or 10K either side of the temperatures given above.

During the process of charging the high pressure air store, air is drawn in from atmosphere and passes through heat exchanger elements 101, 201 and 301 to pick up heat so that on entry to the first compression process, its temperature is $T_3$ whilst its pressure remains at $p_0$. The air passes through several stages of compression and after each one, its temperature rises to $T_4$ but is dropped back to $T_3$ again by passing through heat exchanger elements 400, 401, 402, ... etc. embedded in the highest grade thermal store. This air subsequently passes downwards through the thermal stores in reverse order (3,2,1) surrendering heat to each one in turn so that its temperature falls in turn to $T_2$, $T_1$ and $T_0$ respectively. The pressurised air then passes into the high pressure store, 5. There is no movement of water during this process. Moreover, when this process is in steady-state, there is negligible net movement of heat from the lower-grade thermal stores (1,2,3). Although heat is removed by the ambient-pressure air being heated up prior to compression, this heat is restored by the pressurised air falling back down in temperature from $T_3$ to $T_0$.

The three lower-grade thermal stores, (1,2,3) receive heat from an external thermal source, 7, whenever that heat is available. A pump, 8, circulates a heat transfer fluid to carry the gathered heat into thermal stores (3,2,1) in this order. The process of charging the lower-grade thermal stores (1,2,3) from this external source, 7, can occur at any time and is not necessarily synchronised with the charging of the high pressure air store. The pressure of the heat transfer fluid is substantially constant in this circuit at the value $p_T$. Water might be used as this heat transfer fluid but more typically a mineral-oil would serve in this context.

During the process of discharging the system, high pressure air is withdrawn from the high pressure air store, 5, and water is simultaneously pumped from the water tank, 6, using pump 9 such that its pressure is raised from $p_0$ to $p_1$. The high pressure air passes through heat exchange provisions 101, 201 and 301 so that its temperature rises from $T_0$ to $T_1$, $T_2$ and subsequently $T_3$. The pressurised water passes through heat exchanger provisions 102 and 202 so that its temperature rises from $T_0$ to $T_1$ and then to $T_2$. The proportion of water being mixed with the high pressure air is determined directly by pump 9. This proportion is determined as a compromise between two considerations. The first consideration is the requirement that the heat being absorbed from the highest grade thermal store, 4, per kg of air during discharging is similar to the heat that is deposited into that highest grade thermal store, 4, per kg of air during the compression. The second consideration is that after the expansion back down to ambient pressure $p_0$, the temperature of the expanded air+steam mixture should be close to After leaving heat exchange element 203, the water is still in liquid state. Before it enters heat exchange element 303, the water is evaporated. Clearly (in the ideal model) the temperature remains constant between the water and gaseous states. The latent heat of evaporation is delivered from heat pump, 12, which sources its heat from condensing water vapour in the exhaust stream from the expansion process. There are many possible formats for heat pump, 12, but it one very obvious format is that the working fluid within the heat pump might itself be distilled water operating between two pressures very similar to $p_0$ (on the low temperature side) and $p_1$ (on the high temperature side).

Once the water has been transformed into vapour following the heat injection from heat pump, 12, the resulting steam enters heat exchange provision, 303 where it becomes superheated to temperature $T_4$ before being mixed with the high pressure air in mixing junction, 14.

The mixture of air and steam then enters a single expansion stage, 23, where its pressure falls back down from $p_1$ to $p_0$ and its temperature correspondingly drops from $T_4$ to approximately $T_1$. At this point, little or none of the steam has yet condensed back to liquid water. The air+steam mixture enters the cold side of heat pump, 12, where heat is removed from it causing the steam to condense. As it emerges from this, the mixture is still at temperature 7; but now contains liquid water carried with a stream of air and possibly a small fraction of water vapour. This mixture proceeds through heat exchange provision 101 and surrenders all remaining heat into the lowest-grade thermal store, 1. The water content is collected in separator, 10, and falls naturally back into the water tank, 6. The air is vented to atmosphere.

Variations on the First Embodiment

The system works most effectively if the high pressure air store, 5, is an isobaric (constant pressure) store in effect. However, variations of the invention are possible where the store is more isochoric (constant volume). One simple means by which the change between types of air store could be implemented would be by inserting variable-pressure-ratio pressure boost machinery between the main compression/expansion machinery set, 11, and the high pressure air store, 5.

In the description of the specific embodiment given above, water is proposed in three different roles: (i) as the main working fluid blended with the high pressure air during the process of discharging the system, (ii) as the main thermal storage medium for the lowest-grade thermal store and (iii) as the working fluid within the heat pump, 12. In all three cases, it is conceivable that another fluid could be used. Water is attractive because it is virtually zero cost and because it has a very high specific heat as a liquid. It is especially attractive for multiple engineering reasons to utilise the same working fluid in the heat pump as is used to complement the air in the discharging process. Water might also be used as the heat-transfer fluid associated with the collection of low grade heat but more usually this would be a mineral oil.

In the specific embodiment described above (FIG. 2), there were three stages of compression and expansion took place in a single stage. Other system configurations are possible. In the most straightforward cases to understand, all compression stages achieve the same compression ratio and then all of the heat of compression is injected into the highest-grade thermal store, 4. In these cases, all that matters is that the number of compression stages is greater than the number of expansion stages. A comparison between the number of compression stages and the number of expansion stages provides a fairly direct measure of the mass-ratio between air and water in all cases. In cases where more than one expansion stage was utilised, a first stage of expansion might reduce the temperature of the air-steam mixture to temperature $T_2$ so that the mixture was reheated to $T_4$, prior to a second expansion stage. A person skilled in the art of designing such systems would ensure that heat being withdrawn from the different thermal stores would have to be balanced by the net heat being deposited in those stores.

In some variations on this first embodiment, it is possible to omit one layer of the thermal stores thermal store 3. Through judicious choice of number of total pressure ratio and number of compression stages, we can achieve $T_2=T_3$ in the above description and then there is no requirement for thermal store 3.

In some variations of this embodiment, it may be appropriate to omit the heat-pump, 12. This is especially likely when the temperature, $T_2$, is above 647K (assuming that water is being used as the additional working fluid). In most cases, this heat pump should be present.

Further Embodiments of the Invention

In all of the remaining embodiments described here, the additional fluid used in the expansion process is air compressed isothermally from ambient air using a compression facility separate from the multi-stage compression facility.

Figure 4:
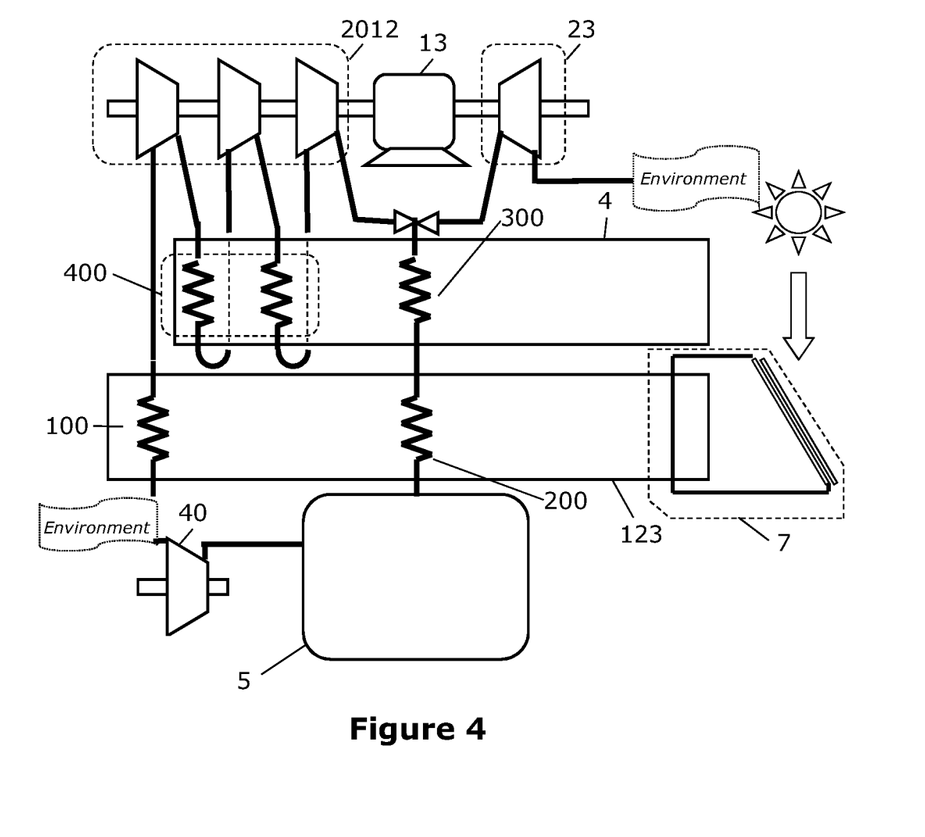
FIG. 4 presents a schematic diagram of a second embodiment of the invention.
Figure 6:
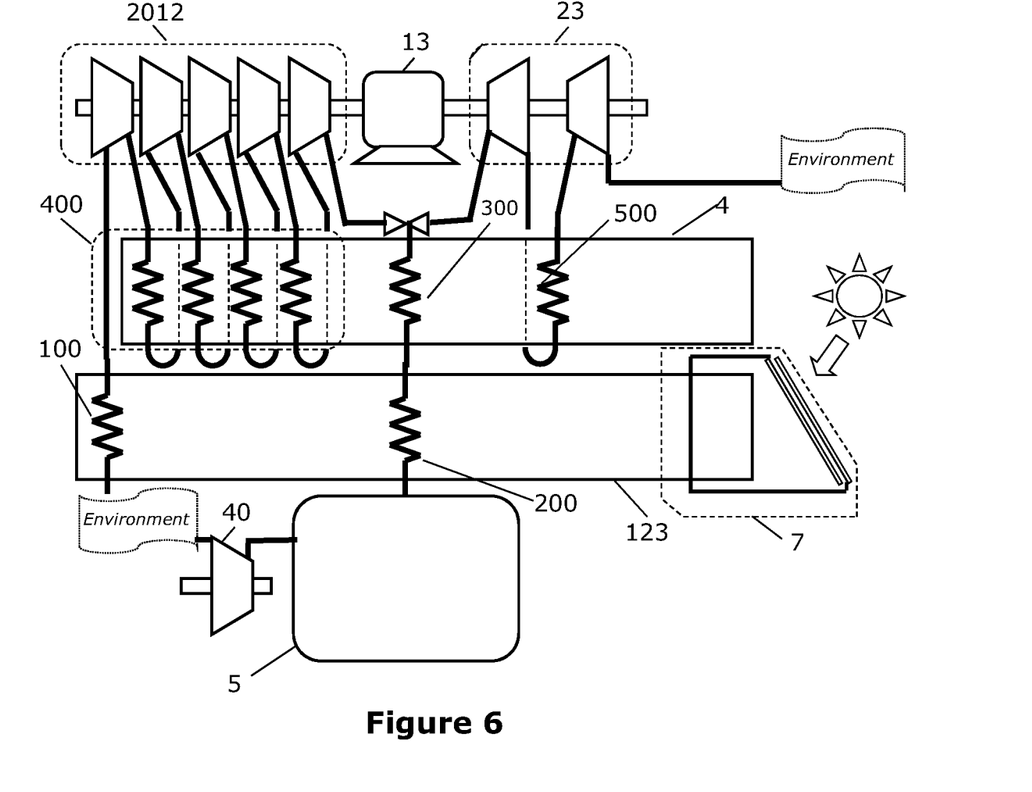
FIG. 6 presents a schematic diagram for the third embodiment in which the multi-stage compression facility comprises five stages of compression and expansion has two stages but the exhaust from the first expansion stage does not fall close to ambient.
Figure 7:
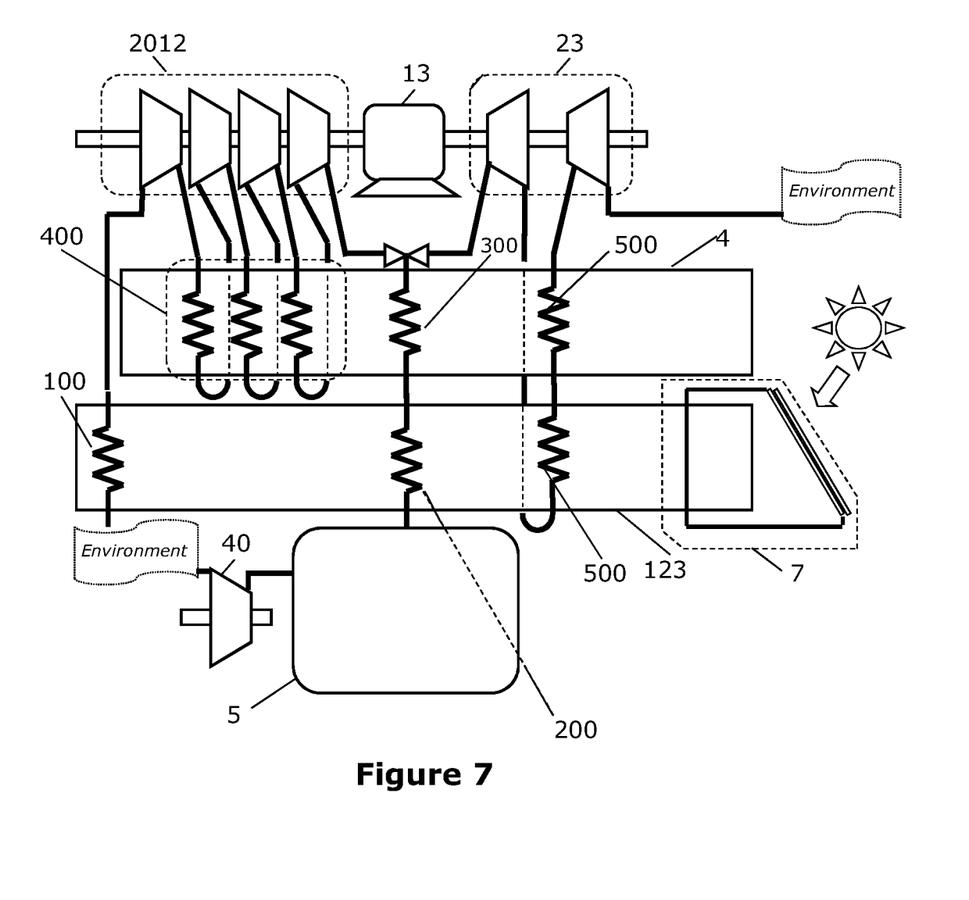
FIG. 7 presents a schematic diagram for the third embodiment in which the multi-stage compression facility comprises five stages of compression and expansion has two stages and in this case the exhaust from the first expansion stage does fall close to ambient.

We refer to these embodiments collectively as the "all-air embodiments". FIGS. 4, 6 and 7 support the description of second, third and fourth specific embodiments of the invention which fall into the category of being "all-air embodiments". Where previously three separate thermal stores comprised the provision for the storage of low-grade heat, a single thermal store is employed here for all low-grade heat storage. For consistency with the definitions of the first embodiment, the first and second temperatures of the summary of this invention are denoted $T_3$ and $T_4$ respectively and the quantities $T_1$ and $T_2$ have no meaning here.

FIG. 4 presents a schematic diagram of a second embodiment of the invention In FIG. 4, the multi-stage compression facility comprises three stages.

FIG. 5 is composed of three graphs showing three alternative ways in which a two-stage expansion process might draw heat from the lower-grade and higher-grade thermal stores.

FIG. 6 presents a schematic diagram for the third embodiment in which the multi-stage compression facility comprises five stages of compression and expansion has two stages but the exhaust from the first expansion stage does not fall close to ambient.

FIG. 7 presents a schematic diagram for the third embodiment in which the multi-stage compression facility comprises five stages of compression and expansion has two stages and in this case the exhaust from the first expansion stage does fall close to ambient.

The system of interest in this case is illustrated in FIG. 4 and comprises the following elements:

A store for high pressure (HP) air, 5. This store preferably has an isobaric characteristic in the sense that the pressure of the pressurised air retained in the air store remains relatively constant over the complete range of states between "charged" and "discharged". The store will often be realised as an underwater containment where the external pressure of water surrounding the containment reduces the stresses that would otherwise exist on the containment and provides a convenient means to regulate storage pressure automatically. Alternative methods to realise this isobaric characteristic are also possible for example pumping water into a fixed-volume containment as air is drawn out and vice-versa. The storage pressure is denoted $p_H$ and typically this will be between 20 times and 500 times greater than atmospheric pressure, $p_0$.

A storage provision for low grade heat, 123, in a temperature range $T_0$-$T_3$ where $T_0$ represents ambient temperature and $T_3$ is a "first temperature" typically between 100° C. (373.15K) and 400° C. (773.15K).

A storage provision for high grade heat, 4, in a temperature range $T_3$-$T_4$ where $T_4$ is a "second temperature" typically in the range from 300° C. (573.15K) and 650° C. (923.15K).

A first compression resource, 2012. This is invariably a multi-stage compressor accepting intake air at ambient pressure but at an elevated temperature $T_3$ (the "first temperature" of the invention summary). Air enters each stage of this multi-stage compressor at the "first temperature" and exits it at $T_4$, the "second temperature". This machine corresponds to elements 20, 21 and 22 collectively of FIG. 2. Much (usually all) of the heat of compression developed from this compression resource is passed into the high grade thermal storage provision, 4. This first compression resource will normally comprise an electrically driven compressor. It raises the air pressure from ambient pressure up to storage pressure, $p_H$. The number of compression stages is denoted $N_C$. After each one of these stages, the air temperature has risen to approximately the second temperature, $T_4$, and heat is removed from the air again immediately after the compression stage to return the air temperature back down to the first temperature, $T_3$.

A second compression resource, 40. All heat of compression from this is rejected directly to the ambient environment. This may sometimes comprise a set of wave energy converters acting to compress air up to pressure $p_H$. Alternatively, it could represent a compressor mechanically coupled to a wind turbine rotor or a so-called hydraulic compressor where water flow is used directly to draw air down to substantial depths below surface.

An expansion resource, 23. The expansion resource converts all of the exergy stored in both the HP air store (5) and the thermal stores (123 and 4) back into mechanical work and subsequently into electricity using an electrical motor/generator, 13. The expansion resource, 23, may sometimes be a single-stage device if the storage pressure, $p_H$, is not very high. Typically, for storage pressures of 60 bar and below, a single-stage expansion facility will be used. For higher storage pressures, the expansion resource will normally comprise at least two stages. Where two stages are present in the expansion resource, there are several sensible options depending on the details of the available air store and the maximum temperature at which there is potential to capture external heat. Each different two-stage expansion arrangement can be described in terms of the temperatures at the entry and exit. Thus one arrangement has temperature trajectory $T_4$-$T_0$-$T_4$-$T_0$ while another has temperature trajectory $T_4$-$T_0$-$T_3$-$T_0$ and another still follows $T_4$-$T_3$-$T_4$-$T_0$.

A heat exchange provision, 100, used to raise ambient pressure air from temperature $T_0$ up to temperature $T_3$ drawing heat from the low grade thermal store, 123, so that this air is ready to enter the first compression resource, 2012.

A heat exchange provision, 200, used to exchange heat between air pressurised up to storage pressure, $p_H$, and the low grade thermal store, 123. This heat exchange operates between temperatures $T_0$ and $T_3$ and it can operate both ways either cooling the HP air prior to its entry into HP air store 5 or heating the HP air after its exit from the HP store.

A heat exchange provision, 300, used to exchange heat between air pressurised up to storage pressure, $p_H$, and the high grade thermal store, 4. This heat exchange operates between temperatures $T_1$ and $T_2$ and it can operate both ways either cooling the HP air prior to its exit from the final stage of the second compression resource, 40, or heating the HP air prior to its entry into the first stage of the expansion resource, 23.

Another heat exchange provision, 400, used only to transfer heat between partially-compressed air and the high grade thermal store, 4.

Further heat exchange provisions, 500, used only to transfer heat between partially-expanded air and the thermal stores, 4 and/or 123. If the expansion resource, 23, has two stages, then would certainly be a heat exchange provision 500 and there might or might not be an item 501 etc.

A thermal collection provision, 7, used to collect heat from some external source in the temperature range $T_0$ to $T_3$. For simplicity, we consider that this provision includes some pumping facility to drive a heat transfer fluid to support the transfer of heat into the low grade thermal store, 123.

Numbers of Stages of Compression and Expansion for the all-Air Embodiments.

In each of the all-air embodiments, here are two distinct compression resources present in the system. The first compression resource, 2012, comprises $N_C$ compression stages with cooling of the air from temperature $T_4$ down to $T_3$ immediately after each stage in a special set of heat exchangers. In most instances of this invention, all of the heat of compression from this first compression resource, 2012, emerges in the temperature range $T_3$-$T_4$. It is possible to conceive of instances of the invention where the air entering some of the compression stages within the first compression resource, 2012, is at ambient temperature $T_0$ but in most cases it is preferable that the air entering each one of these stages is at temperature $T_3$. For the remainder of this document, it is assumed that all stages of the first compression resource, 2012, induct air at temperature $T_3$ and discharge it at $T_4$.

The second compression resource, 40, rejects the heat of compression to the environment and it is not relevant how many stages of compression this employs. The actual number will generally be a trade-off between performance and cost.

Figure 5A:
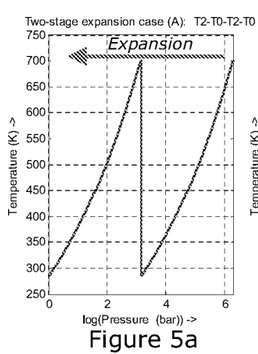
FIG. 5 shows three graphs showing three alternative ways in which a two-stage expansion process might draw heat from the lower-grade and higher-grade thermal stores.
Figure 5B:
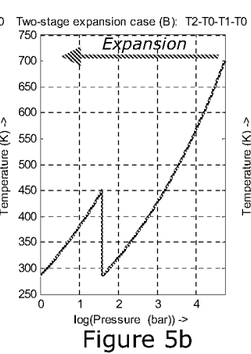

The expansion provision, 23, often comprises a single stage of compression especially when the storage pressure, $p_H$, is not very high (e.g. $p_H$<60 bar). For higher storage pressures, the expansion resource, 23, is likely to comprise two or more stages. Even with two stages of expansion, there are several logical configurations possible for the expansion resource, 23. FIG. 5 indicates three different configurations where the expansion resource, 23, comprises two stages. In FIG. 5a, the air temperature follows the path $T_4$-$T_0$-$T_4$-$T_0$. In FIG. 5b, the air temperature follows the path $T_4$-$T_0$-$T_3$-$T_0$. In FIG. 2c, the air temperature follows the path $T_4$-$T_3$-$T_4$-$T_0$. The calculation section following this applies different identities depending on which expansion approach is used. Note that in all cases discussed here, the expansion provision, 23, discharges air at ambient temperature $T_0$ and ambient pressure $p_0$ so that no exergy is lost unnecessarily. It is possible that some instances of this invention would use three or more stages of expansion in the expansion resource, 23, but the extensions to deal with more stages are relatively trivial and so these are not discussed further.

Calculations Relevant to Design of all-Air Embodiments.

These calculations clarify the system design intent for cases where the system design falls into the category of "all-air embodiments". In these calculations, we assume ideal behaviour of all components and that the air behaves as a simple ideal gas with a constant value of $\gamma=1.40$ and constant specific heat. Ambient temperature is taken as $T_0=290K$ and the specific gas constant for air is taken to be $R_{air}=287$ J/kgK. These simplifications provide an ability to perform approximate system calculations for system design. Refinement of the system would obviously be undertaken by a skilled engineer prior to realisation. We define overall pressure ratio r as $$r(p_H/p_0) \quad (1)$$

The compression ratio in each stage of compression of the first compression resource, 2012, is $$s = r^{(1/N_C)} \quad (2)$$

Temperatures $T_3$ and $T_4$ are related by $$T_4 = T_3 \times s^Z \quad (3)$$

where $$\chi := (\gamma - 1/\gamma) \quad (4)$$

For air with $\gamma=1.4$, we find that $\chi=0.2856$. Temperature $T_3$ is determined mainly by knowledge of the expansion arrangement. If there is only one stage in the expansion resource, 23, then $$T_3 = T_0 \times (r/s)^\chi \quad (5)$$

In this case, heat balance in the high temperature air store demands that the mass of air passed through the expansion process, $m_{e1}$ is related to $m_2$ (the mass of air passed through the first compression facility, 2012, according to $$m_e = m_2 \times N_C \quad (6)$$

Figure 5C:
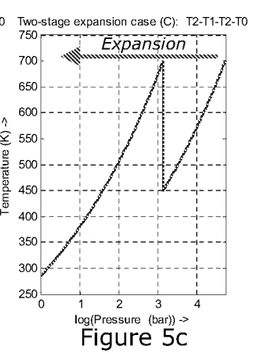

If the expansion has two stages, then depending on whether these expansion stages follow FIG. 5a, FIG. 5b or FIG. 5c, temperatures $T_3$ and $T_4$ are calculated from equations (7a), (7b) or (7c) respectively (combined with equations (1) to (3)):

$$r^\chi(T_4/T_0) \times (T_4/T_0) s^{2\chi} (T_3/T_0)^2 \quad (7a)$$

$$r^\chi(T_4/T_0) \times (T_3/T_0) s^\chi (T_3/T_0)^2 \quad (7b)$$

$$r^\chi(T_4/T_3) \times (T_4/T_0) s^\chi (T_4/T_0) = s^{(2\chi)} (T_3/T_0) \quad (7c)$$

By considering that the air being expanded must remove the same amount of heat from the high grade thermal store, 4, as is put in by air during the compression process, we can determine the relationship between $m_2$ and $m_e$ as equation (8a), (8b) or (8c) according to whether FIG. 5a, FIG. 5b or FIG. 5c describes the expansion process:

$$m_e = m_2 \times N_C/2 \quad (8a)$$

$$m_e = m_2 \times N_C \quad (8b)$$

$$m_e = m_2 \times N_C/2 \quad (8c)$$

Conservation of mass dictates that the total mass of air expanded in one complete discharge cycle must be identical to the sum of the masses of air compressed in one complete charging cycle from the two distinct compression resources, 2012 and 40. Denoting these masses of air as $m_1$ and $m_2$ respectively and denoting by $m_e$ the mass of air passing through the expansion resource, 23, we have $$m_e = m_1 + m_2 \quad (9)$$

The first compression action comprises $N_C$ stages—each with similar pressure ratio, s. The total work done to compress a certain mass of air, $m_1$, through the second compression resource (30) is given by $$W_{C1} = N_C \times m_1 R_{Air} T_3 (s^\chi - 1)/\chi \quad (11)$$

If the second compression resource, 40, is isothermal at temperature $T_0$ (as would usually be the case), the work done to compress a certain mass of air, $m_2$, is given by $$W_{C2} = m_1 R_{Air} T_0 \ln(r) \quad (10)$$

Here $R_{Air}$ is the specific gas constant for air—approximately 287.3 J/kgK.

The work done in expansion is dependent on the configuration of the expansion resource, 23. If expansion takes place in a single stage, we have $$W_E = m_e R_{Air} T_0 (r^\chi - 1)/\chi = m_e R_{Air} (T_4 - T_0)/\chi \quad (12)$$

If the expansion resource, 23, comprises two stages, then these may be configured as FIG. 5a, FIG. 5b or FIG. 5c indicates. Then the work done by a mass, $m_{e1}$ of air as it is expanded is given by equations (13a), (13b) or (13c) respectively.

$$W_E = 2m_e R_{Air}(T_4 - T_0)/\chi \quad (13a)$$

$$W_E = m_e R_{Air}((T_4 - T_0) + (T_3 - T_0))/\chi \quad (13b)$$

$$W_E = m_e R_{Air}((T_4 - T_1) + (T_3 - T_0))/\chi \quad (13c)$$

The amount of heat required from the external heat input is straightforward to compute. It depends only on the number of times that the expanding air is heated up to (or above) temperature $T_1$. For single stage expansion or expansion following FIG. 5c the heat required to be provided from the external source is $$Q_X = m_e c_p (T_3 - T_0) \quad (14)$$

If the air being expanded passes through the temperature range from $T_0$ to $T_3$ twice, (as happens in FIG. 5a and FIG. 5b), then the heat required to be provided from the external source is $$Q_x = 2m_e c_p (T_3 - T_0) \quad (15)$$

The above analysis enables one to conduct the design calculations for any system following embodiments of the present invention where the additional gaseous fluid is also air that has been compressed adiabatically by some resource, where the expansion resource, 23, is either single stage or two stage and where the first compression resource, 2012, comprises $N_c$ stages with air entering each of those stages at temperature $T_3$.

A Second Embodiment an Instance of an "all-Air Embodiment"

FIG. 4 depicts the system analysed in this first embodiment. The HP air store, 5, retains air at 60 bar, $p_H = 6 \times 10^6$ Pa. There are three stages of compression ($N_C = 3$) and there is only one stage of expansion. Taking atmospheric pressure to be 101,325 Pa (1 atm), we calculate r=59.22. Letting atmospheric temperature be 285 K, we determine the highest temperature, $T_4$, to be $T_4 = 914.7$K (641.5° C.) and the intermediate temperature, $T_3$, to be $T_3 = 620.1$K (347° C.).

In this system, each 1 kg of air compressed by the first compression resource, 2012, must be accompanied by an additional 2 kg compressed by the second compression resource, 40, so that 3 kg of air flows through the expander to absorb the heat from high grade thermal store, 4.

Using equation (10) each 1 kg of air pressurised by the first compression resource, 2012, absorbs 887.7 kJ of work. From equation (11), each 1 kg of air pressurised by the second compression resource, 40, absorbs 333.8 kJ of work. On average the input work done per kg of air compressed is 518.4 kJ.

Employing equation (12), it is seen that the work extracted from each 1 kg in the expansion facility is 632.5 kJ. In short, it is clear that this system is a net generator with a factor of 1.22 relating the output work (electricity) to the total input work. This assumes that all components behave in an ideal way. Since they will not do so in reality, it is probable that the actual ratio between output work and input work would actually fall below 1. If the second compression resource, 40, is not driven from electrical power, the ratio between electrical output energy and electrical input energy in this case could be up to 2.137 (=632.5/(887.7×(⅓))).

The heat supplied externally to charge the lower grade thermal store 123 is what makes it possible for this system to export more work than it takes in. Using equation (14), we calculate that the heat injected for each 1 kg of air expanded is 336.5 kJ.

It is instructive to examine the ratio between the total exergy stored by this system in a fully-charged state and the exergy that is stored in the HP air store alone. Since each 1 kg of air compressed isothermally contains only 333.8 kJ of work and each 1 kg of air drawn from the HP air store, 5, delivers up to 632.5 kJ, we see that the net exergy storage capacity of the system being studied here is 1.89 times greater than the exergy storage capacity of the HP air stores alone. Obviously the additional storage capacity arises from the thermal energy stores.

A Third Embodiment Another Instance of an "all-Air Embodiment"

The system analysed in this embodiment (shown schematically in FIG. 6) uses five stages of compression ($N_C = 5$) and there are two stages of expansion following the pattern shown in FIG. 5c. The HP air store, 5, retains air at 120 bar, $p_H = 120 \times 10^6$ Pa. Taking atmospheric pressure to be 101,325 Pa (1 atm), we calculate r=118.43. Letting atmospheric temperature be 285 K, we determine the second temperature, $T_4$, to be $T_4 = 848.7$K (575.6° C.) and the first temperature, $T_3$, to be $T_3 = 646.1$K (372.9° C.).

In this system, each 1 kg of air compressed by the first compression resource, 2012, must be accompanied by 1.5 kg compressed by the second compression resource, 40, so that 2.5 kg of air flows through the expander to absorb the heat from high grade thermal store 4.

Using equation (10) each 1 kg of air pressurised by the first compression resource, 2012, absorbs 1,017.8 kJ of work. From equation (11), each 1 kg of air pressurised by the second compression resource, 40, absorbs 390.5 kJ of work. On average the input work done per kg of air compressed is 641.4 kJ.

Employing equation (13c), it is seen that the average work extracted from each 1 kg in the expansion facility is 929.0 kJ. This system is a net generator with a factor of 1.45 relating the output work (electricity) to the input work—assuming that all components behave in an ideal way. In reality, due to irreversibilities at various places in the system, the actual ratio between total output work and total input work would probably be around 1.2. If the second compression resource, 40, is not driven from electrical power, the ratio between electrical output energy and electrical input energy in this case could be up to 2.282 (=929.0/(1017.8×(⅖))).

The heat supplied externally to charge the lower grade thermal store 123 is what makes it possible for this system to export more work than it takes in. Using equation (14), we calculate that the heat injected for each 1 kg of air expanded is 362.7 kJ.

It is instructive to examine the ratio between the total exergy stored by this system in a fully-charged state and the exergy that is stored in the HP air store alone. Since each 1 kg of air compressed isothermally contains only 390.5 kJ of work and each 1 kg of air drawn from the HP air store, 5, delivers up to 1,017.8 kJ, we see that the net exergy storage capacity of the system being studied here is 2.37 times greater than the exergy storage capacity of the HP air stores alone. Obviously the additional storage capacity arises from the thermal energy stores. In this instance, substantial quantities of heat are retained in the high grade thermal store 4.

A Fourth Embodiment—Another Instance of an "all-Air Embodiment"

The system analysed in this third embodiment (shown schematically in FIG. 7) uses four stages of compression ($N_C$=4) and there are two stages of expansion following the pattern shown in FIG. 2a. The HP air store, 5, retains air at 400 bar, $p_H$=400×10$^6$ Pa. Taking atmospheric pressure to be 101,325 Pa (1 atm), we calculate r=394.77. Letting atmospheric temperature be 285 K, we determine the highest temperature (the second temperature), $T_4$, to be $T_4$=669.5K (396.4° C.) and the intermediate temperature (the first temperature), $T_3$, to be $T_3$=436.8K (163.7° C.).

In this system, each 1 kg of air compressed by the first compression resource, 2012, must be accompanied by 1 kg compressed by the first compression resource, 40, so that 2 kg of air flows through the expander to absorb the heat from high grade thermal store 4.

Using equation (10), each 1 kg of air pressurised by the first compression resource, 2012, absorbs 862.3 kJ of work. From (11), each 1 kg of air pressurised by the second compression resource, 40, absorbs 465.5 kJ of work. On average the input work done per kg of air compressed is 663.8 kJ.

Employing equation (13a), it is seen that the work extracted from each 1 kg in the expansion facility is 718.3 kJ. This system is a net generator with a factor of 1.08 relating the output work (electricity) to the input work—assuming that all components behave in an ideal way. In reality, the actual ratio between total output work and total input work would be less than 1. If the second compression resource, 40, is not driven from electrical power, the ratio between electrical output energy and electrical input energy in this case could be up to 1.666 (=718.3/(862.3×(⅔))).

The heat supplied externally to charge the lower grade thermal store 123 is what makes it possible (in theory at least) for this system to export more work than it takes in. Using equation (14), we calculate that the heat injected for each 1 kg of air expanded is 143.5 kJ.

Each 1 kg of air compressed isothermally contains only 390.5 kJ of work and each 1 kg of air drawn from the HP air store, 5, delivers up to 718.3 kJ, we see that the net exergy storage capacity of the system being studied here is 1.54 times greater than the exergy storage capacity of the HP air stores alone. The additional storage capacity arises from the thermal energy stores.

Other embodiments are intentionally within the scope of the invention as defined by the appended claims.

The invention claimed is:

1. An energy storage system comprising:
   an approximately isobaric storage volume for storing compressed air at constant pressure;
   a multi-stage gas compressor configured to compress air that has been heated to a first temperature, the compression being such that the air leaving each compression stage reaches a second temperature;
   an expander operable to extract work from gas entering the expander at the second temperature such that an exhaust gas emerges at a temperature significantly lower than the first temperature, wherein the gas comprises the air from the multi-stage gas compressor;
   one or more first thermal stores configured to retain heat at temperatures in a range up to the first temperature;
   one or more second thermal stores configured to retain heat at temperatures in a range between the first temperature and second temperature;
   a thermal capture for capturing heat from an external source for storing in the one or more first thermal stores at temperatures in a range up to the first temperature;
   wherein the system is operable to store energy in a charging mode, the charging mode comprising two or more different charging processes that are independently operable; and
   wherein the two or more charging processes comprise:
      a first charging process in which the air is compressed in the multi-stage compressor to fill the storage volume with pressurized gas and the second thermal store is simultaneously filled with heat; and
      a second charging process in which the first thermal store is filled with heat;
   wherein a total mass of gas expanded in the expander in a discharging mode is greater than a total mass of gas compressed in the multi-stage gas compressor in the first charging process.

2. The energy storage system of claim 1, wherein the gas further comprises an additional gaseous fluid, said additional gaseous fluid being either: air having been compressed separately from the multi-stage compressor used for the first charging process; or steam obtained by evaporating water that has previously had its pressure raised by a pump.

3. The system of claim 1, wherein the external source comprises a solar energy collector.

4. The system of claim 1, wherein the expander is a multi-stage expander.

5. The system of claim 4, wherein the gas is heated to the second temperature by the second thermal store or the first and second thermal store, before each expansion stage of the multi-stage expander.

6. The system of claim 4, wherein the number of compression stages of the multi-stage compressor is greater than the number of expansion stages of the multi-stage expander.

7. A method of storing and releasing energy, the method comprising:
   heating air to a first temperature using heat stored in a first thermal store;
   pressurizing the heated air such that its temperature rises from the first temperature to a second temperature;
   extracting heat from the pressurized air to cool the air from the second temperature to the first temperature and storing the extracted heat in a second thermal store;
   extracting heat from the pressurized air to further cool the air from the first temperature to a third temperature and storing the extracted heat in the first thermal store;
   storing the pressurized air with an approximately isobaric characteristic in a storage volume;
   heating a pressurized gas from the storage volume to the first temperature using heat from the first thermal store, wherein the pressurized gas comprises the pressurized air;
   heating the pressurized gas to the second temperature using heat from the second thermal store;
   expanding the pressurized gas to extract work from the pressurized gas such that the pressurized gas is cooled from the second temperature to a lower temperature; and
   storing heat from an external heat source in the first thermal store;
   wherein a total mass of the pressurized gas when expanded is greater than a total mass of the pressurized air.

8. The method of claim 7 wherein the first thermal store comprises a plurality of first thermal stores; and wherein:

heating the air to the first temperature comprises heating the air in each of the plurality of first thermal stores; and extracting heat from the pressurized air to cool the pressurized air from the first temperature to the third temperature and storing the extracted heat in the first thermal store comprises storing a portion of the extracted heat in each of the plurality of first thermal stores.

9. The method of claim 7, wherein pressurizing the heated air comprises pressurizing the air in a plurality of compression stages, and wherein heat is extracted from the pressurized air after each of the plurality of stages and stored in the second thermal store.

10. The method of claim 7, wherein the external heat source comprises a solar energy collector.

11. The method of claim 7, further comprising the step of adding an additional fluid to the pressurized gas before expanding the pressurized gas; and wherein expanding the pressurized gas further comprises expanding the pressurized gas and the additional fluid.

12. The method of claim 11, wherein adding the additional fluid to the pressurized gas comprises heating the additional fluid using heat stored in the first and/or second thermal store.

13. The method of claim 11, wherein the additional fluid comprises air or steam.

* * * * *